(12) United States Patent
Shibuno

(10) Patent No.: US 9,137,447 B2
(45) Date of Patent: Sep. 15, 2015

(54) IMAGING APPARATUS THAT GENERATES AN IMAGE INCLUDING AN EMPHASIZED IN-FOCUS PART OF A CAPTURED IMAGE

(71) Applicant: Panasonic Corporation, Osaka (JP)

(72) Inventor: Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/199,037

(22) Filed: Mar. 6, 2014

(65) Prior Publication Data

US 2015/0036001 A1 Feb. 5, 2015

(30) Foreign Application Priority Data

Jul. 31, 2013 (JP) ................................. 2013-158598

(51) Int. Cl.
*H04N 5/232* (2006.01)

(52) U.S. Cl.
CPC ....... *H04N 5/23293* (2013.01); *H04N 5/23203* (2013.01); *H04N 5/23212* (2013.01)

(58) Field of Classification Search
None
See application file for complete search history.

(56) References Cited

U.S. PATENT DOCUMENTS

| 2006/0139459 | A1* | 6/2006 | Zhong ........................ 348/211.2 |
| 2009/0109310 | A1 | 4/2009 | Kobayashi et al. |
| 2009/0237523 | A1* | 9/2009 | Date et al. .................. 348/222.1 |
| 2014/0333790 | A1* | 11/2014 | Wakazono ................. 348/222.1 |

FOREIGN PATENT DOCUMENTS

| JP | 2004-96166 | 3/2004 |
| JP | 2005-260479 | 9/2005 |
| JP | 2009-111487 | 5/2009 |

* cited by examiner

*Primary Examiner* — Albert Cutler
(74) *Attorney, Agent, or Firm* — Wenderoth, Lind & Ponack, L.L.P.

(57) ABSTRACT

An imaging apparatus capable of wirelessly communicating with a display device, including: an imaging unit configured to capture a subject image to generate a captured image; a peaking processor configured to adjust emphasis of in-focus part in the captured image according to an image quality setting of image displayed on the display device of a peaking image to be sent to the display device, to generate a peaking image including emphasized in-focus part of the captured image, when a mode for performing a peaking process on the captured image is set; and a sending unit configured to send the peaking image to the display device by wireless communication.

2 Claims, 8 Drawing Sheets

Fig. 8

| INPUT | OUTPUT | THRESHOLD VALUE (0~255) |
|---|---|---|
| HD (THINNING IS SMALL) | EVF (960 × 720) | 10 |
| | LCD (800 × 600) | 20 |
| | WiFi (VGA) (640 × 480) | 30 |
| | WiFi (QVGA) (320 × 240) | 40 |
| STD (THINNING IS LARGE) | EVF | 50 |
| | LCD | 60 |
| | WiFi (VGA) | 70 |
| | WiFi (QVGA) | 90 |

IMAGING APPARATUS THAT GENERATES AN IMAGE INCLUDING AN EMPHASIZED IN-FOCUS PART OF A CAPTURED IMAGE

BACKGROUND

1. Technical Field

The present disclosure relates to an imaging apparatus with a peaking function which emphasizes an in-focus part of an captured image to display and ability to wirelessly connect to a display device.

2. Related Art

As one of camera functions, a function of emphasizing an in-focus part of a captured image to display on a monitor of the camera (hereinafter, referred to as "peaking function") is known. JP 2009-111487 A discloses an imaging apparatus which performs the peaking function on a display image. The peaking function, which helps users in finding an in-focus position, is useful particularly in manual focus.

SUMMARY

The present disclosure provides an imaging apparatus, which wirelessly sends an image to a display device such as a smart phone, configured to allow users to easily check an in-focus part of a captured image.

The present disclosure provides an imaging apparatus capable of wirelessly communicating with a display device. The imaging apparatus includes: an imaging unit configured to capture a subject image to generate a captured image; a peaking processor configured to adjust emphasis of in-focus part in the captured image according to an image quality setting of image displayed on the display device of a peaking image to be sent to the display device, to generate a peaking image including emphasized in-focus part of the captured image, when a mode for performing a peaking process on the captured image is set; and a sending unit configured to send the peaking image to the display device by wireless communication.

The present disclosure can provide an imaging apparatus which allows users to easily check focusing even when the image is wirelessly sent to a display device.

BRIEF DESCRIPTION OF DRAWINGS

FIG. 8 is a table showing threshold values used for peaking adjustment according to input (image capture setting) and output (display setting).

DETAILED DESCRIPTION OF PREFERRED EMBODIMENTS

Embodiments will be described in detail below with reference to the drawings as required. However, unnecessarily detailed description may be omitted. For example, detailed description of already known matters and repetition of substantially the same configuration may be omitted. Such omissions are for avoiding unnecessary redundancy in the following description to facilitate understanding by those skilled in the art. The inventor(s) provide the accompanying drawings and the following description for those skilled in the art to fully understand the present disclosure and does not intend to limit the subject matter described in the claims by the accompanying drawings and the following description.

First Embodiment

1-1. Configuration

A configuration of an imaging system of the present disclosure and configurations of a digital camera and a smart phone included in the imaging system will be described below with reference to the accompanying drawings.

1-1-1. Configuration of System

Figure 1:
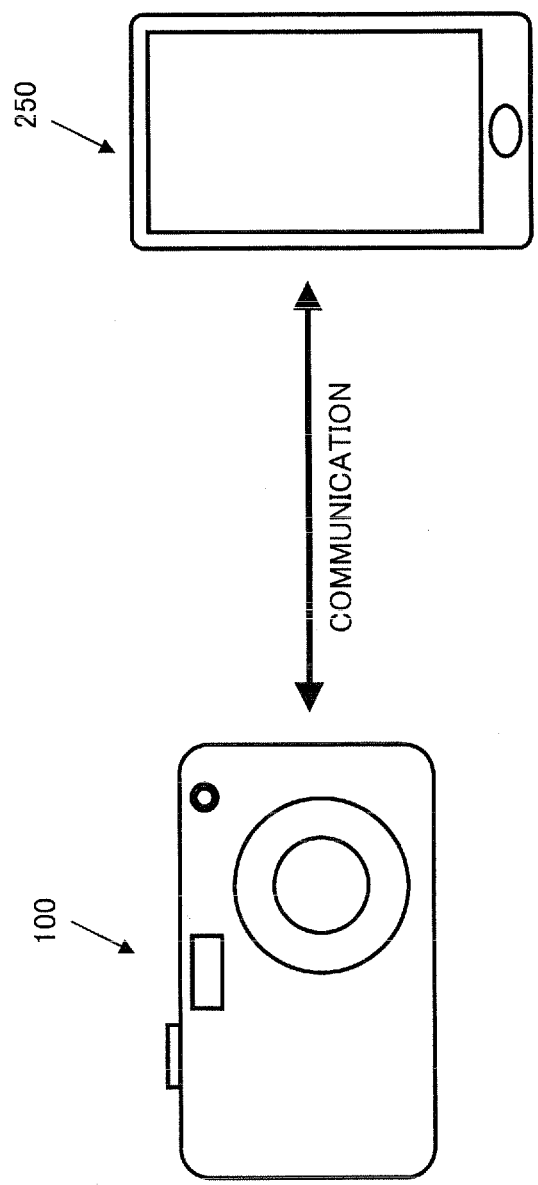
FIG. 1 is a configuration diagram of a system including a digital camera 100 and a smart phone 250.

A configuration of an imaging system including a digital camera and a smart phone in the first embodiment will be described with reference to FIG. 1. FIG. 1 is a diagram illustrating a configuration of an imaging system according to the first embodiment.

The imaging system includes a digital camera 100 and a smart phone 250. The digital camera 100 has a communication unit which can send data of an image to be displayed on a shooting standby screen (hereinafter, referred to as "through image") and data of an image recorded on a recording medium (hereinafter, referred to as "recorded image") to the smart phone 250.

On the other hand, the smart phone 250 has a communication unit which receives the through image and the recorded image sent from the digital camera 100. Both of the communication units of the digital camera 100 and the smart phone 250 can implement wireless communication based on wireless LAN standards such as Wi-Fi, for example.

When receiving data of a through image from the digital camera 100, the smart phone 250 can display the through image on a display unit of the smart phone 250. Further, the digital camera 100 can transfer a recorded image newly generated in image recording operation to the smart phone 250.

1-1-2. Configuration of Digital Camera

Figure 2:
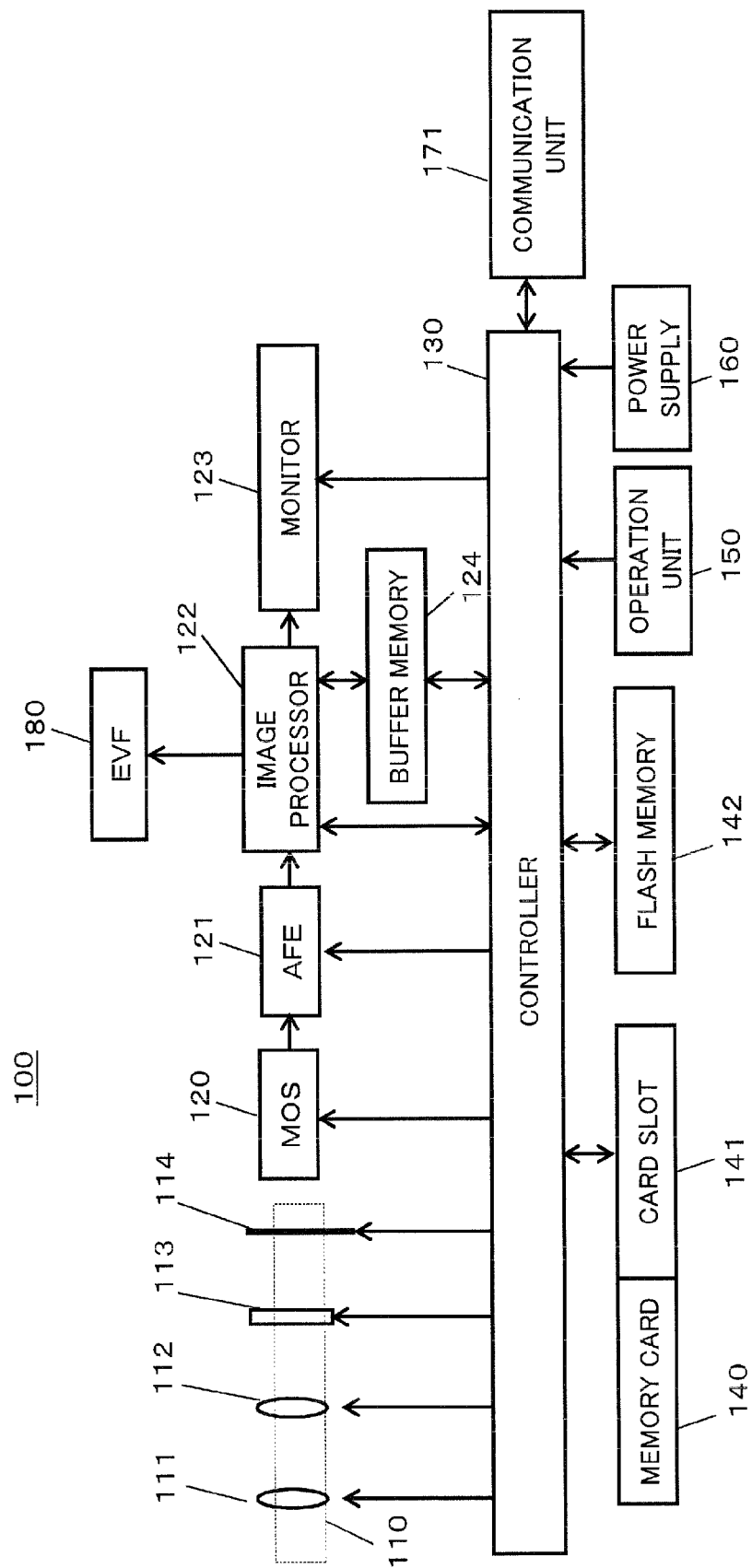
FIG. 2 is a block diagram of a configuration of the digital camera 100.

FIG. 2 is a block diagram of a configuration of the digital camera 100. The respective configurations will be described below.

A optical system 110 includes a focus lens 111, a zoom lens 112, a diaphragm 113, a shutter 114, and the like. Although not illustrated in the diagram, the optical system 110 may include an optical camera shake correcting lens (optical image stabilizer OIS). The various types of lenses included in the optical system 110 may be composed of any number of lenses or any number of lens groups.

A MOS image sensor 120 captures a subject image formed by the optical system 110 to generate captured image data. The MOS image sensor 120 generates captured image data of a new frame at a predetermined frame rate (for example, 60 frames/second). Timing of generating the captured image data and electronic shutter operation of the MOS image sensor 120 are controlled by a controller 130. With an image based on the captured image data successively displayed on a monitor 123 as the through image, the user can confirm the state of the subject on the monitor 123 in real time.

An AFE (Analog Front End) 121 performs noise suppression by means of correlation double sampling, gain multiplication based on an ISO sensitivity values by means of an analog gain controller, and AD conversion by means of an AD convertor on the captured image data read out from the MOS image sensor 120. Then, the AFE 121 outputs the image data to an image processor 122.

The image processor 122 performs various types of processing on the captured image data output from the AFE 121 to generate image data. The various types of processing include, but not limited to, BM (block memory) integration, smear correction, white balance correction, gamma correction, YC conversion process, electronic zoom process, compression process, expansion process, and the like. The image processor 122 may be implemented by a hardwired electronic circuit or a microcomputer using programs. The image processor 122 may also be implemented into a single semiconductor chip together with the controller 130 and the like.

The monitor 123 is provided on the back surface of the digital camera 100. The monitor 123 displays an image based on the image data processed by the image processor 122. The image displayed on the monitor 123 includes the through image and the recorded image.

The controller 130 performs integrated control over the operation of the whole digital camera 100. The controller 130 may be implemented by a hardwired electronic circuit or may be implemented by a microcomputer or the like. The controller 130 may also be implemented into a single semiconductor chip together with the image processor 122 and the like.

A flash memory 142 functions as an internal memory for recording image data and the like. The flash memory 142 also stores programs related to autofocus control (AF control) and communication control as well as programs for performing integrated control over the operation of the whole digital camera 100.

A buffer memory 124 is a storage unit that functions as a work memory for the image processor 122 or the controller 130. The buffer memory 124 may be implemented by a DRAM (Dynamic Random Access Memory) or the like.

A card slot 141 is a connection unit to which can be attached and detached a memory card 140. To the card slot 141, the memory card 140 can be electrically and mechanically connected. The card slot 141 may also have a function of controlling the memory card 140.

The memory card 140 is an external memory that contains a recording device such as a flash memory. The memory card 140 can record data such as the image data to be processed in the image processor 122.

A communication unit 171, which is a wireless communication interface, is a communication module for implementing a wireless communication function, for example. Via the communication unit 171, the controller 130 can connect to the Internet network. In the embodiment, it is assumed that the communication unit 171 is a communication module complying with the WiFi standards, for example.

A power supply 160 supplies power to respective components of the digital camera 100. The power supply 160 may be a battery or in any other form of receiving input from an AC power supply via a cable.

The operation unit 150 collectively refers to members receiving user operations and includes operation buttons, operation levers, a touch panel, and the like provided on the exterior of the digital camera 100. When receiving user operation, the operation unit 150 sends respective operation instructing signals to the controller 130. The operation unit 150 includes a power switch for switching ON/OFF of the power supply state of the power supply 160 to the digital camera 100.

1-1-3. Configuration of Smart Phone

Figure 3:
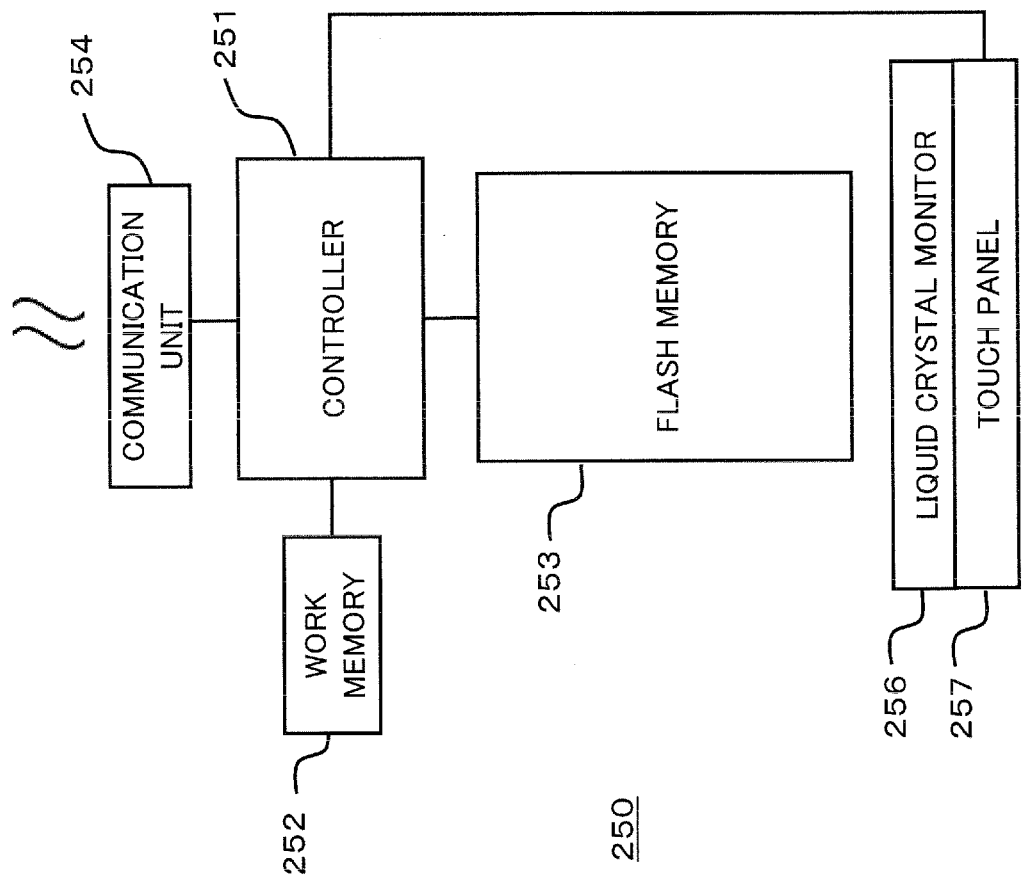
FIG. 3 is a block diagram of a configuration of the smart phone 250.

A configuration of the smart phone 250 will be described with reference to FIG. 3. FIG. 3 is a block diagram of the configuration of the smart phone 250.

The smart phone 250 includes a controller 251, a work memory 252, a flash memory 253, a communication unit 254, a monitor 256, a touch panel 257, and the like. The smart phone 250 may further include an imaging unit and an image processor (not shown).

The controller 251 is a processing unit for controlling the processes in the smart phone 250. The controller 251 is electrically connected with the work memory 252, the flash memory 253, the communication unit 254, the monitor 256, and the touch panel 257. The controller 251 receives the operation instructing signals issued in response to user operation on the touch panel 257. The controller 251 can read data stored in the flash memory 253. The controller 251 also controls over the whole system operation including the power supply to the respective components of the smart phone 250. Although not illustrated in the figure, the controller 251 performs a phone function and executes various application programs downloaded via the Internet.

The work memory 252 is a memory that temporarily stores information needed by the controller 251 in executing respective types of processing operation.

The flash memory 253 is a large capacity disk drive for storing various types of data. As described above, the various types of data stored in the flash memory 253 can be read by the controller 251 as required. Although the present embodiment is provided with the flash memory 253, the present embodiment may be provided with a hard disk drive or the like instead of a flash memory.

The monitor 256 is a display device which displays a screen specified by the controller 251.

The touch panel 257 is an input device which receives information about user operation. Although the smart phone 250 is provided with the touch panel 257 as the input device for receiving information about user operation in the present embodiment, the smart phone 250 may be provided with hard keys instead of a touch panel.

The communication unit 254 can record image data received from the controller 251 on the flash memory 253 and send the image data to another device over the Internet network. Although it is assumed that the communication unit 254 performs communication based on, as an example, a WiFi interface in the embodiment, the idea of the present disclosure is not limitedly applied to the WiFi interface but may be applied to other communication interfaces.

1-2. Operation

Figure 4:
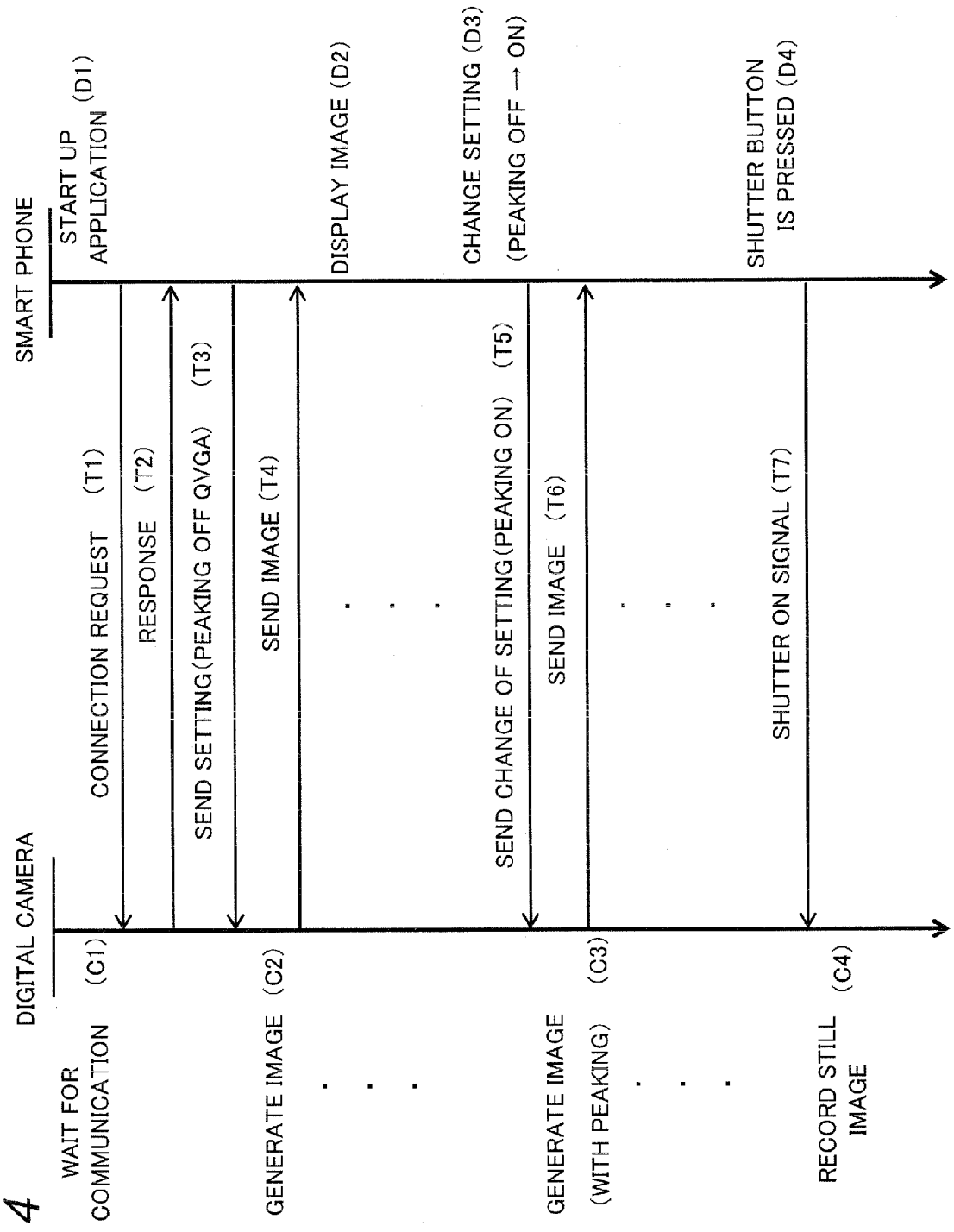
FIG. 4 is a sequence diagram for describing an example of a communication process between the digital camera 100 and the smart phone 250.

WiFi connecting operations of to the smart phone 250 by the digital camera 100 having a WiFi connecting function will be described with reference to FIG. 4. FIG. 4 is a diagram describing a sequence of connecting operation of the digital camera 100.

In FIG. 4, it is assumed that an initial link setup for the WiFi connection has been completed between the digital camera 100 and the smart phone 250. Further, it is assumed that the digital camera 100 is set to MF (manual focus) mode. Further, it is assumed that the smart phone 250 is set to QVGA (320×240 pixels) display and the peaking setting is set to OFF in default settings.

In addition, it is assumed that the smart phone 250 has already installed an application program for supporting remote control for the digital camera 100 via WiFi communication. The smart phone 250 can obtain the application program by downloading the application program from a predetermined server.

Figure 5:
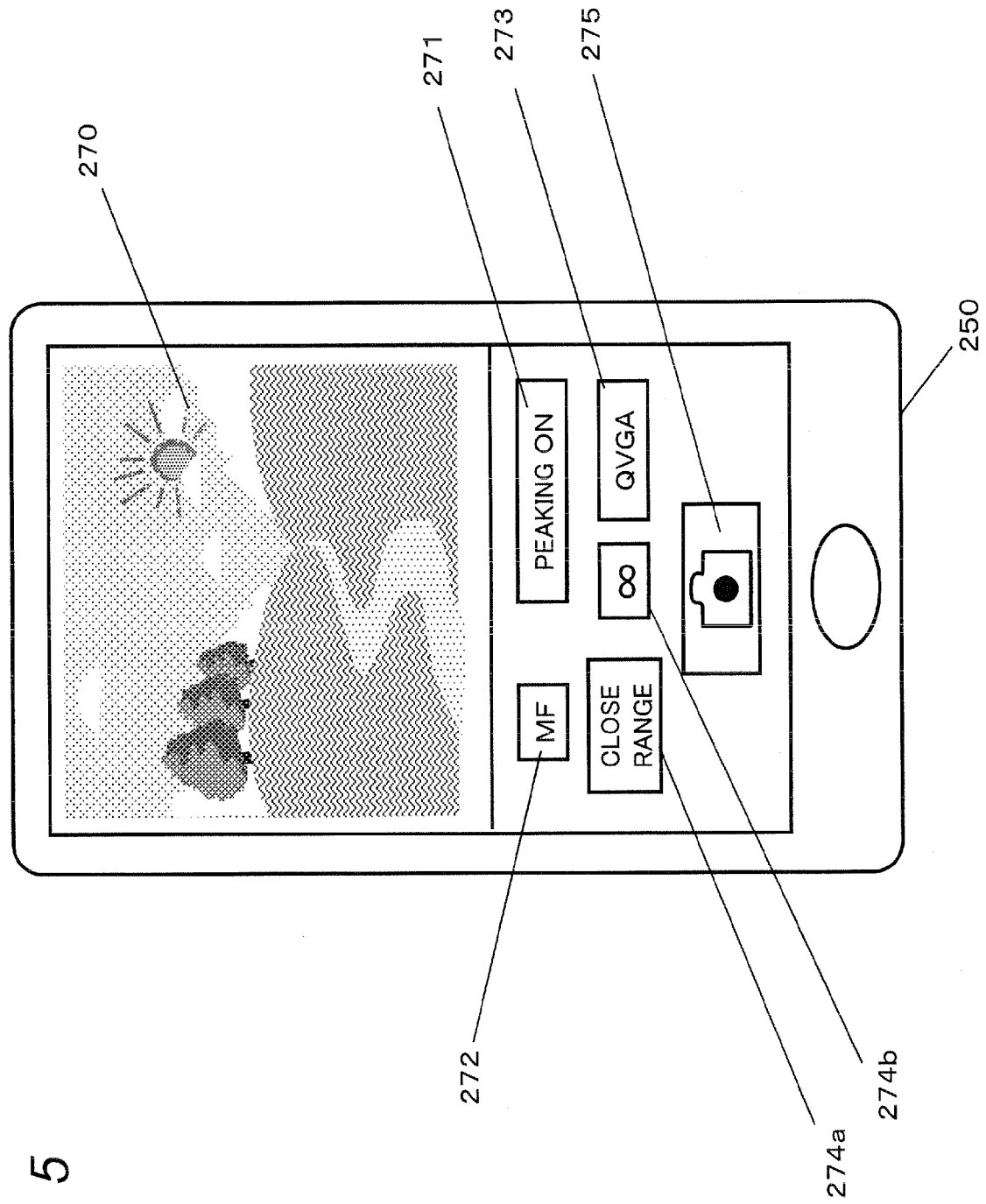
FIG. 5 is a diagram for describing a display screen example of the smart phone 250.

FIG. 5 illustrates an example of a display screen shown on the smart phone 250 in response to execution of the above described application program. On a liquid crystal monitor 256 of the smart phone 250, an image 270 based on the image data received from the digital camera 100 as well as various buttons for remote control are displayed. Specifically, an ON/OFF switch button 271 for the peaking function, an MF/AF switch button 272, a QVGA/VGA switch button 273, manual focus buttons 274, and a shutter button 275 are displayed on the liquid crystal monitor 256.

The smart phone 250 implements the functions shown below by the controller 251 controlling the respective components. The digital camera 100 implements the functions shown below by the controller 130 controlling the respective components.

Referring to FIG. 4, when the application program is started up by user operation on the touch panel 257 in a power ON state (D1), the smart phone 250 sends a WiFi connection request to the digital camera 100 via the communication unit 254 (T1).

In response to the WiFi connection request, the digital camera 100 in a communication standby state sends a WiFi connection response to the smart phone 250 via the communication unit 171 (T2).

The controller 251 of the smart phone 250 sends settings of the application program including peaking display: OFF and display resolution: QVGA to the digital camera 100 via the communication unit 254 (T3).

The controller 130 of the digital camera 100 refers the received settings of the application program and generates an image to send to the smart phone 250 (C2).

The controller 130 sends the generated image to the smart phone 250 via the communication unit 171 (T4).

The smart phone 250 displays the received image on the monitor 256 (D2).

As long as the WiFi connection state between the digital camera 100 and the smart phone 250 is kept and no user operation is received, the processes in steps C2, T4, and D2 are cyclically performed. As a result, the user can confirm a video being captured by the digital camera 100 on the smart phone 250.

When the setting of peaking display is switched from OFF to ON by user operation on the application program of the smart phone 250 (D3), the controller 251 of the smart phone 250 sends the changed setting of peaking display to the digital camera 100 via the communication unit 254 (T5). The switching of peaking ON/OFF can be implemented by operation on the peaking ON/OFF switch button 271 as illustrated in FIG. 5.

The controller 130 of the digital camera 100 refers the changed setting of peaking display, and perform a peaking process (detailed later) on the captured image to generate an image undergone the peaking process (C3).

The controller 251 sends the generated image to the smart phone 250 via the communication unit 171 (T6).

The smart phone 250 displays the received image which has undergone the peaking process on the monitor 256 (D2). When the shutter button 275 is pressed on the application program of the smart phone 250 by user operation (D4), the controller 251 sends a shutter ON signal indicating that the shutter button 275 is pressed to the digital camera 100 via the communication unit 254 (T7).

The digital camera 100 performs operation for recording a still image based on the received shutter ON signal (C4).

As described above, the WiFi connection between the digital camera 100 and the smart phone 250 enables the user to view a video captured by the digital camera 100 on the smart phone 250, and to perform operations such as changing of the settings of the digital camera 100 and issuing of an instruction to take a still image by operating the smart phone 250.

Especially, as described above, the WiFi connection between the digital camera 100 and the smart phone 250 enables the peaking display when a video captured by the digital camera 100 is displayed on the smart phone 250. As a result, the user is enabled to confirm a position in focus in the video captured by the digital camera 100, on the smart phone 250. Therefore, the user is enabled to adjust the in-focus position of the digital camera 100 with the position in focus confirming. Note that the user is enabled to adjust the in-focus position of the digital camera 100 by operating the manual focus buttons ("Close Range", "∞") 274a and 274b illustrated in FIG. 5. That is, user operation on the "Close Range" button 274a on the smart phone 250 can cause the focus lens 111 of the digital camera 100 to move to the close range side as remote control. Also, user operation on the "∞" button 274b on the smart phone 250 can cause the focus lens 111 of the digital camera 100 to move to the infinity side as remote control.

1-2-1. Display Process of Digital Camera

Figure 6:
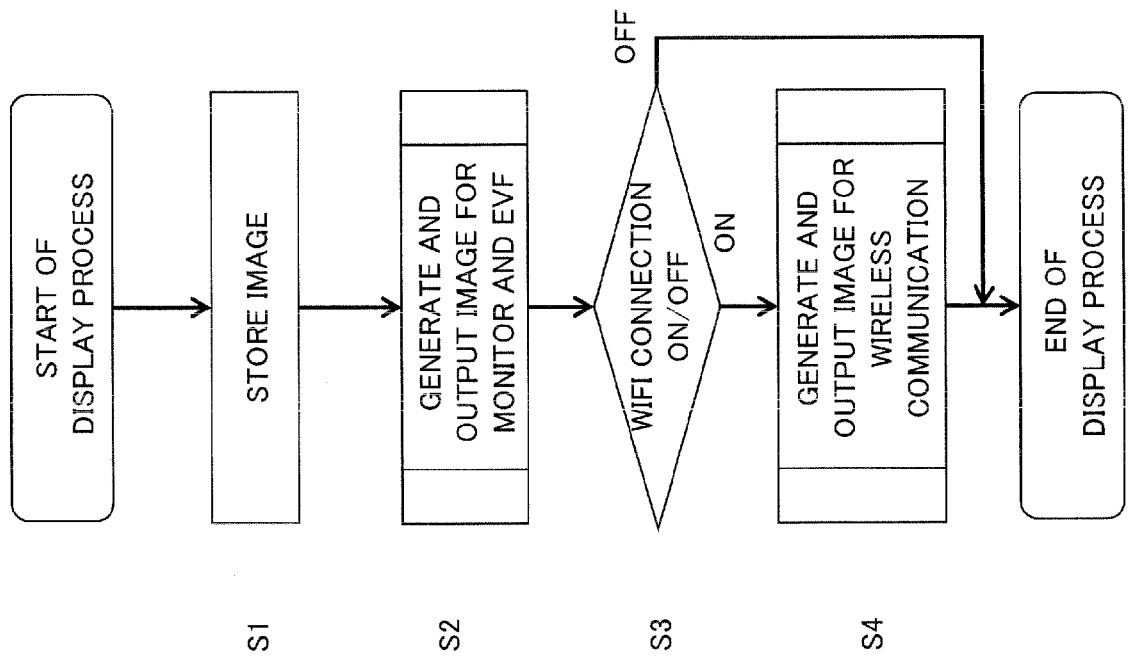
FIG. 6 is a flow chart of display process operation of the digital camera 100.

A process in the digital camera 100 of displaying captured image data captured by the MOS image sensor 120 on the monitor 123, an EVF (Electronic View Finder) 180, and the smart phone 250 will be described with reference to FIG. 6. FIG. 6 is a flow chart of a display process of the digital camera 100.

First, light formed by the optical system 110 is converted into electric signals by the MOS image sensor 120. The electric signals are processed in the AFE 121 and the image processor 122 and stored in the buffer memory 124 as RAW image data (S1).

The controller 130 controls the image processor 122 to generate YC data for display from the RAW image data and output the YC data for display to the monitor 123 or the EVF 180 (S2).

Next, the controller 130 determines whether the WiFi connection has been established between the digital camera 100 and the smart phone 250 (S3).

When the WiFi connection has been established (i.e., WiFi connection: ON), the controller 130 controls the image processor 122 to generate YC data for display different from the YC data for display generated in step S2 from the RAW image data and output the YC data for display to the smart phone 250 via the communication unit 171 (S4)

1-2-2. Generation Process of YC Data for Display

Figure 7:
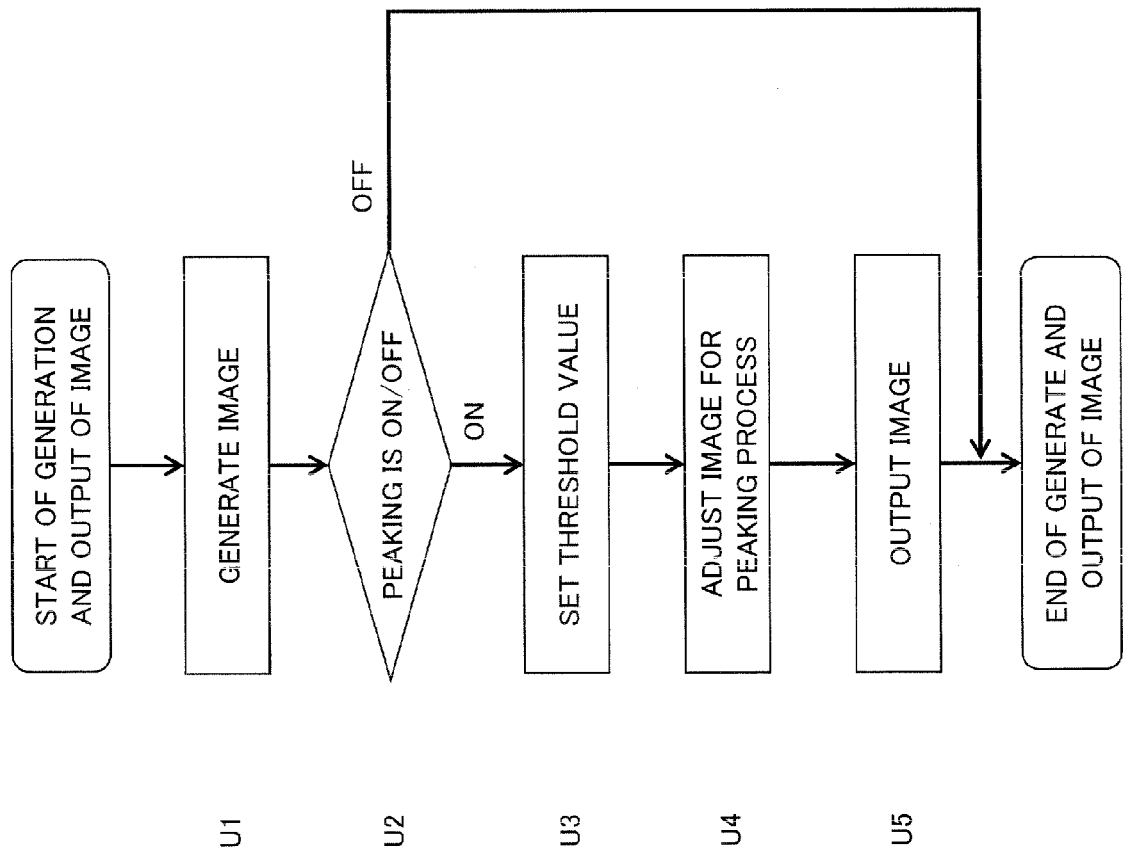
FIG. 7 is a flow chart of image generation/output operation of the digital camera 100.

Next, a generation process of YC data for display in steps S2 and S4 of FIG. 6 will be described with reference to FIG. 7. FIG. 7 is a flow chart of a generation process of YC data for display of the digital camera 100.

First, the controller 130 controls the image processor 122 to generate YC data for display of size to fit the resolution of the image to be output, from the RAW data stored in the buffer memory 124 (U1).

The controller 130 checks whether the peaking display setting is ON (i.e., whether the digital camera is in a mode for performing the peaking process) (U2). Meanwhile, it is assumed that the peaking display setting can be set from both of the digital camera 100 and the smart phone 250.

When the peaking display setting is ON, the controller 130 determines a threshold value of the contrast value for the peaking display based on the size of the input RAW image data and the size of the YC data for display to set the threshold value in the image processor 122 (U3). The threshold value is determined based on the table shown in FIG. 8. Details of the table will be described later.

The image processor 122 compares the contrasts between the respective pixels of the YC data for display with the set threshold value, and performs image adjustment for the peaking process on areas of pixels which exceed the threshold value (U4). For example, the contrast value of the YC data for display is obtained for each pixel. When the contrast value of a target pixel of the YC data for display is larger than the threshold value, the image processor 122 adjusts a parameter of color difference (C) for the target pixel. As a result, the in-focus part is emphasized.

1-2-3. Setting of Threshold Value for Peaking Process

A table storing the threshold values of the contrast value in the peaking display setting will be described. FIG. 8 is a table showing the threshold value for the contrast value of an image in the peaking process set for each combination of an input unit (input condition) and an output unit (output condition).

In the example of FIG. 8, HD (High definition, Hi-Vision image quality) and STD (Standard definition, standard image quality) are shown as examples of the input unit (input condition) for the peaking process of the digital camera 100. Regarding HD, since a small number of pixels are thinned out as compared with the maximum number of pixels for a still image, the size of the RAW image data is large and, thus, high image quality is achieved. Therefore, HD is mainly used for recording a moving image and the like. On the other hand, regarding STD, since a large number of pixels are thinned out, the size of the RAW image data is small and, thus, low power consumption is achieved. Therefore, STD is mainly used for live view and the like.

LCD, EVF, WiFi (VGA), and WiFi (QVGA) are shown as examples of the output unit (output condition).

LCD and EVF are used for displaying (outputting) an image on (to) the monitor 123 and the EVF 180 of the digital camera 100. The monitor 123 and the EVF 180 are in direct electrical connection with the controller 130 and the image processor 122. As a result, high transfer rates of an image to the monitor 123 and the EVF 180 are achieved and, also, high image quality can be achieved for the displayed image. Therefore, the sizes of the YC data for display for the LCD and the EVF (the monitor 123 and the EVF 180) are relatively large.

On the other hand, WiFi (VGA) and WiFi (QVGA) are wireless communication standards used for displaying (outputting) an image on (to) the monitor 256 of the smart phone 250. Since data transfer via WiFi (VGA) or WiFi (QVGA) is susceptible to the wireless transfer rate and communication environments, transfer rates of image to the smart phone 250 are slow. As a result, the sizes of the YC data for display on the smart phone 250 is relatively small. Therefore, the sizes of the YC data for display for WiFi (VMA) and WiFi (QVGA) is relatively small.

It is assumed that the peaking process is performed on the same subject. When sizes of the image are large both in the input unit and the output unit, change in contrast at the boundary between the pixels is moderate, thus, the contrast value is low. Therefore, the threshold value for the peaking needs to be set relatively low. On the other hand, when sizes of the image are small both in the input unit and the output unit, change in contrast at the boundary between the pixels is sharp, thus, the contrast value is high. Therefore, the threshold value for the peaking needs to be set relatively high.

With the threshold value of the contrast value for each combination of the input unit and the output unit set as described above, the display qualities of the images in peaking displays on the monitor 123 and the EVF 180 of the digital camera 100 and the display qualities of the images in peaking displays on the monitor 256 of the smart phone 250 can be maintained at suitable levels.

That is, in the above described embodiment, the threshold value is set larger for STD which has a large number of pixels thinned out than for HD which has a small number of pixels thinned out.

Further, the threshold value is set larger for the output destinations of wireless (radio) connections than for the output destinations of wired connections.

Note that, when YC data for display is subject to digital zoom and displayed in the digital camera or the smart phone, the contrast value of the display image is small (a contrast is hardly presented). In that case, the threshold values defined in FIG. 8 may be adjusted as required. For example, when digital zoom provides 2× magnification, the threshold value may be lowered by half.

1-3. Conclusion (1) As described above, in the present embodiment, the digital camera 100 is an imaging apparatus having a peaking function which emphasizes an in-focus part of a captured image to display and ability to wirelessly communicate with the smart phone 250 (an example of a display device). The digital camera 100 includes the MOS image sensor 120 which captures a subject image to generate a captured image, the controller 130 which generates a peaking image including emphasized in-focus part of the captured image when the mode for performing the peaking process on the captured image is set, and the communication unit 171 which sends the peaking image to the smart phone 250 by wireless communication. The controller 130 adjusts the emphasis of the in-focus part of the captured image according to an image quality setting about display on the smart phone 250 for the peaking image to be sent to the smart phone 250, to generate the peaking image. Accordingly, peaking display can be performed on the monitor 256 of the smart phone 250 with the same qualities of the peaking displays on the monitor 123 and the EVF 180 of the digital camera 100, therefore, the user more easily confirms focusing.

(2) The controller 130 may generate the peaking image including emphasized in-focus part of the captured image, according to a threshold value. Also, the controller 130 may adjust the threshold value according to a size or resolution (HD and STD) of the captured image captured by the MOS image sensor 120. For example, the controller 130 may adjust the threshold value to the lower value, as the size or resolution of an image output from the MOS image sensor 120 is larger.

(3) The controller 130 may adjust the threshold value according to a size or a resolution of an image to be displayed on the display unit (the monitor 123 and the EVF 180). For example, the controller 130 may adjust the threshold value to the lower value, as the size or resolution of an image to be displayed on the display unit (the monitor 123 and the EVF 180) is larger.

(4) The controller 130 may adjust the threshold value according to a size or resolution (VGA/QVGA) of an image to be sent to the smart phone 250. For example, the controller 130 may adjust the threshold value to the lower value, as the size or resolution (VGA/QVGA) of an image to be sent to the smart phone 250 is larger.

Other Embodiments

As described above, the first embodiment is described as an example of the arts disclosed in the present application. However, the arts in the present disclosure are not limited to that embodiment and may also be applied to embodiments which are subject to modification, substitution, addition, and omission as required. Other embodiments will be exemplified below.

As input from an imaging device, STD and HD which are different in the number of pixels thinned out are exemplified in the embodiment. However, the arts of the present disclosure is not limited to that embodiment, and may be applied to any input from the imaging device as long as the input is images different in pixel mixture or RAW zoom process. That is, only the size or resolution of the image input from the imaging device needs to be different.

Further, in the present embodiment, communication modules complying with the WiFi standards are described as examples of the communication unit 171 of the digital camera 100 and the communication unit 254 of the smart phone 250. However, the arts of the present disclosure are not limited to that embodiment, and communication modules complying with the Bluetooth standards may be used, for example. That is, communication modules which can perform wireless communication may be used as the communication units 171 and 254

The above described embodiment is described as an example of the arts in the present disclosure. For that purpose, the accompanying drawings and the detailed description is provided.

Therefore, the constituent elements shown or described in the accompanying drawings and the detailed description may include not only the constituent element necessary to solve the problem but also the constituent element unnecessary to solve the problem in order to exemplify the arts. Accordingly, it should not be instantly understood that the unnecessary constituent element is necessary only because the unnecessary constituent element is shown or described in the accompanying drawings and the detailed description.

Also, since the above described embodiment is for exemplifying the arts in the present disclosure, various changes, substitutions, additions, omissions, and/or the like may be performed on the above described embodiment without departing from the scope of the claims and the their equivalent.

INDUSTRIAL APPLICABILITY

The present disclosure can be applied to an imaging apparatus capable of wirelessly communicating with a display device. For example, the present disclosure can be applied to a digital camera, a mirrorless camera, a single-lens reflex camera, a monitoring camera, a camera-equipped smart phone, and the like.

What is claimed is:

1. An imaging apparatus capable of wirelessly communicating with a display device, comprising:
    an imaging unit configured to capture a subject image to generate a captured image;
    a peaking processor configured to adjust emphasis of an in-focus part in the captured image to generate a peaking image including an emphasized in-focus part of the captured image when a mode for performing a peaking process on the captured image is set, wherein the peaking processor adjusts the emphasis of the in-focus part according to an image quality setting for the peaking image on the display device; and
    a sending unit configured to send the peaking image to the display device by wireless communication;
    wherein
    the image quality setting is a size or a resolution of an image displayed on the display device,
    the peaking processor generates the peaking image including the emphasized in-focus part of the captured image, according to a threshold value of contrast, and
    the threshold value is adjusted to be lowered, as the size or the resolution of image displayed on the display device is larger.

2. An imaging apparatus capable of wirelessly communicating with a display device, comprising:
    an imaging unit configured to capture a subject image to generate a captured image;
    a peaking processor configured to adjust emphasis of an in-focus part in the captured image to generate a peaking image including an emphasized in-focus part of the captured image when a mode for performing a peaking process on the captured image is set, wherein the peaking processor adjusts the emphasis of the in-focus part according to an image quality setting for the peaking image on the display device; and
    a sending unit configured to send the peaking image to the display device by wireless communication;
    wherein
    the peaking processor adjusts the emphasis of the in-focus part in the captured image according to a size or a resolution of a captured image generated by the imaging unit to generate the peaking image,
    the peaking processor generates the peaking image including the emphasized in-focus part of the captured image, according to a threshold value of contrast, and
    the threshold value is adjusted to be lowered, as a size or a resolution of the captured image generated by the imaging unit is larger.

* * * * *